(12) United States Patent
Simpson et al.

(10) Patent No.: US 7,814,088 B2
(45) Date of Patent: *Oct. 12, 2010

(54) SYSTEM FOR IDENTIFYING WORD PATTERNS IN TEXT

(75) Inventors: Don M. Simpson, Alpharetta, GA (US); Robert W. Usey, Jr., Atlanta, GA (US)

(73) Assignee: Nuance Communications, Inc., Burlington, MA (US)

( * ) Notice: Subject to any disclaimer, the term of this patent is extended or adjusted under 35 U.S.C. 154(b) by 325 days.

This patent is subject to a terminal disclaimer.

(21) Appl. No.: 12/119,349

(22) Filed: May 12, 2008

(65) Prior Publication Data

US 2008/0208569 A1    Aug. 28, 2008

Related U.S. Application Data

(63) Continuation of application No. 09/801,340, filed on Mar. 7, 2001, now Pat. No. 7,426,505.

(51) Int. Cl.
G06F 17/30 (2006.01)
(52) U.S. Cl. .......................... 707/708; 707/794
(58) Field of Classification Search .............. 707/1–6, 707/705–708, 739, 771, 794; 706/55
See application file for complete search history.

(56) References Cited

U.S. PATENT DOCUMENTS 4,815,005 A    3/1989  Oyanagi et al.
4,931,935 A    6/1990  Ohira et al.
4,982,340 A    1/1991  Oyanagi et al.

(Continued)

FOREIGN PATENT DOCUMENTS

EP    0597630 A1    11/1993

(Continued)

OTHER PUBLICATIONS

DOSS YOR919990503, "System, Method and Program Product for Answering Questions Using a Search Engine".

(Continued)

*Primary Examiner*—Cam-Linh Nguyen
(74) *Attorney, Agent, or Firm*—Wolf, Greenfield & Sacks, P.C.

(57) ABSTRACT

A system for identifying word patterns in text is conducted in real time and is highly suitable for network and Internet use. The system comprises a semantic network that may be compiled on a local computer or at a remote host and a software text analysis module for receiving the text to be analyzed, parsing the text, submitting the text to the semantic network, and receiving the results. Recognized, words are then examined, together with surrounding words in the text to determine whether the words are part of a word pattern. Word patterns are located at nodes in the semantic network in a hierarchical structure, and certain word patterns correspond to objects of the semantic network. When all word patterns involving a word are located, links are followed to objects corresponding to the word patterns. Several nodes may point to a single object, but each object is represented only once in the semantic network. Identified objects may thus be identified in real time, as the text streams through the text analysis module.

8 Claims, 7 Drawing Sheets

U.S. PATENT DOCUMENTS

| | | |
|---|---|---|
| 5,020,021 A | 5/1991 | Kaji et al. |
| 5,299,125 A | 3/1994 | Baker et al. |
| 5,559,940 A | 9/1996 | Hutson |
| 5,621,903 A | 4/1997 | Luciw et al. |
| 5,675,819 A | 10/1997 | Schuetze |
| 5,687,384 A | 11/1997 | Nagase |
| 5,742,816 A | 4/1998 | Barr et al. |
| 5,794,050 A | 8/1998 | Dahlgren et al. |
| 5,870,706 A | 2/1999 | Alshawi |
| 5,870,751 A | 2/1999 | Trotter |
| 5,909,678 A | 6/1999 | Bergman et al. |
| 6,006,221 A | 12/1999 | Liddy et al. |
| 6,076,051 A | 6/2000 | Messerly et al. |
| 6,092,074 A | 7/2000 | Rodkin et al. |
| 6,098,033 A | 8/2000 | Richardson et al. |
| 6,104,989 A | 8/2000 | Kanevsky et al. |
| 6,189,002 B1 | 2/2001 | Roitblat |
| 6,243,713 B1 | 6/2001 | Nelson et al. |
| 6,523,029 B1 | 2/2003 | Kulyukin |
| 6,584,464 B1 | 6/2003 | Warthen |
| 6,584,465 B1 | 6/2003 | Zhu et al. |
| 6,813,616 B2 | 11/2004 | Simpson et al. |
| 2002/0013793 A1 | 1/2002 | Bergan et al. |
| 2004/0205035 A1 | 10/2004 | Rimoux |

FOREIGN PATENT DOCUMENTS

| | | |
|---|---|---|
| EP | 0752676 A2 | 7/1996 |
| JP | 4330563 | 11/1992 |

OTHER PUBLICATIONS

"Flyswat" http://web.archive.org/web/20000815052637/http://www.flyswat.com/, Jun. 17, 2004.

Tom Spring, "Updated Flyswat Search Has Better Aim", PCWorld.com, http://web.archive.org/web/20000623181019/http://pcworld.com/pcwtoday/article/0,1510, 15294,00.html.

Paul Heltzel, "Flyswat Beta: Fly Through the Web", Sep. 23, 1999, http://www.pcworld.com/resource/printable/article/0,aid, 12937,00.asp.

Hsi-Jian Lee, "A Language Model based on Semantically Clustered Words in a Chinese Character Recognition System", Pattern Recognition Issue vol. 30, No. 8 pp. 1339-1346, Aug. 1997.

Heltzel, "Flyswat Beta: Fly Through the Web", http://www.pcworld.com/pcwtoday/article/0,1510,12937,00.html.

Hetzle, "Flyswat Beta: Fly Through the Web", http://web.archive.org/web/20000620223854/http://www.pcworld.com/pcwtoday/article/..., Jun. 17, 2004.

Spring, "Updated Flyswat Search Has Better Aim", http://www.pcworld.com/pcwtoday/article/0,1510,15294,00.html, Aug. 5, 2000.

Flyswat, http://www.flyswat.com/, Aug. 5, 2000.

SYSTEM FOR IDENTIFYING WORD PATTERNS IN TEXT

CROSS-REFERENCES TO RELATED APPLICATIONS

This application is a continuation of and claims priority to U.S. patent application Ser. No. 09/801,340 entitled "Method for Identifying Word Patterns in Text" and filed on Mar. 7, 2001 for Don Simpson, et. al, which is incorporated herein by reference.

BACKGROUND OF THE INVENTION

1. The Field of the Invention

The present invention relates to systems for identifying word patterns referenced in text, and more specifically, to identifying the word patterns substantially in real time.

2. The Relevant Art

The Internet may be the most significant technological development of recent times. It allows inexpensive and almost instantaneous communication throughout the world. As more and more users begin to take advantage of the Internet, more resources are being directed to enhancing the ability of users to make use of information available on the Internet.

Particularly, various tools that assist in speeding up Internet transmission, searching the Web, and conducting research are continually being developed and distributed for Internet users' benefit. One type of tool that has been developed and which may be used on information downloaded from the Internet is a text parser. Much of the content available on the Internet is in the form of text documents. Volumes and volumes of information are on the Web in text document format. To assist a user in more readily understanding contents of text documents, developers have provided document parser programs.

Such programs typically receive a text document that a user wishes to have parsed and stores that text document persistently in static memory. The parser then makes continual passes over the text, combing it for identified words. Those words can then be identified and presented to the user, generally with some type of enhancement. Such enhancements may include a dictionary reference, a link to an identified web site, or the like.

Such programs suffer from the drawbacks of being somewhat cumbersome and slow. They require significant processing resources, and accordingly are typically used only on powerful computers such as mainframes, work stations, servers, and the like. Additionally, the wait for a user while the text is parsed is generally considerable, because the multiple passes that are necessary for such parsing takes time and generally must be conducted remotely. This generally slows down research being conducted, and in general, lessens the Internet experience somewhat.

Therefore, what is needed is a manner of identifying word patterns in text in a quick and efficient manner in order to improve research efforts and enhance the abilities of users to profitably use the Internet.

OBJECTS AND BRIEF SUMMARY OF THE INVENTION

The system of the present invention has been developed in response to the present state of the art, and in particular, in response to the problems and needs in the art that have not yet been fully solved by currently available systems. Accordingly, it is an overall object of the present invention to provide a system that overcomes many or all of the above-discussed shortcomings in the art.

To achieve the foregoing object, and in accordance with the invention as embodied and broadly described herein in the preferred embodiment, an improved system for identifying word patterns in text is provided. In certain disclosed embodiments, the system for identifying objects referenced in a stream of text comprises an input pipeline configured to receive an incoming stream of text comprised of words; a text analysis module configured to consult a semantic network to automatically identify one or more word patterns in the incoming stream of text with a single examination of each word; and an object association module configured to reference a known object identified by a word pattern of the semantic network.

The semantic network may be configured to be loaded substantially entirely into RAM memory of a processor, and the text analysis module may be configured to consult the semantic network within the RAM memory. Additionally, the input pipeline may be configured to divide the text. In certain disclosed embodiments the method comprises receiving an incoming stream of text comprised of words; consulting a semantic network to automatically identify one or more word patterns in the incoming stream of text with a single examination of each word; and referencing a known object identified by a word pattern of the semantic network.

The method may also comprise loading the semantic network substantially entirely into RAM memory of a processor and the step of consulting the semantic network may be conducted by consulting the semantic network within the RAM memory.

The semantic network may be consulted in a hierarchical order moving from identified nodes to related nodes linked with the identified nodes. In one embodiment, the method examines words in the stream of text in a sequential order as the words are received and formats the stream of text to represent identified objects without persistently storing the stream of text. The method may also involve breaking the stream of text into individual words and analyzing each word in an order of occurrence of the word in the stream of text by comparing the individual words to identified words in the semantic network.

In addition, the method may involve finding a match between an individual word in the stream of text and a word within the semantic network. Upon finding the match, the method compares the individual word and an adjacent word of the stream of text to a word pattern in the semantic network to find a word pattern involving the word. Additionally, words of the stream of text may be continually added to recognized word patterns and the result compared to other word patterns in the semantic network until no more word patterns containing the individual word are located. Links are preferably followed between the word patterns and recognized objects, and the identified known objects presented to a user.

In one embodiment, the identified objects are presented to a user by providing links between identified word patterns in the stream of text and objects in a knowledge base to which the word patterns identify. The links may be provided in the form of URLs.

BRIEF DESCRIPTION OF THE DRAWINGS

In order that the manner in which the advantages and objects of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
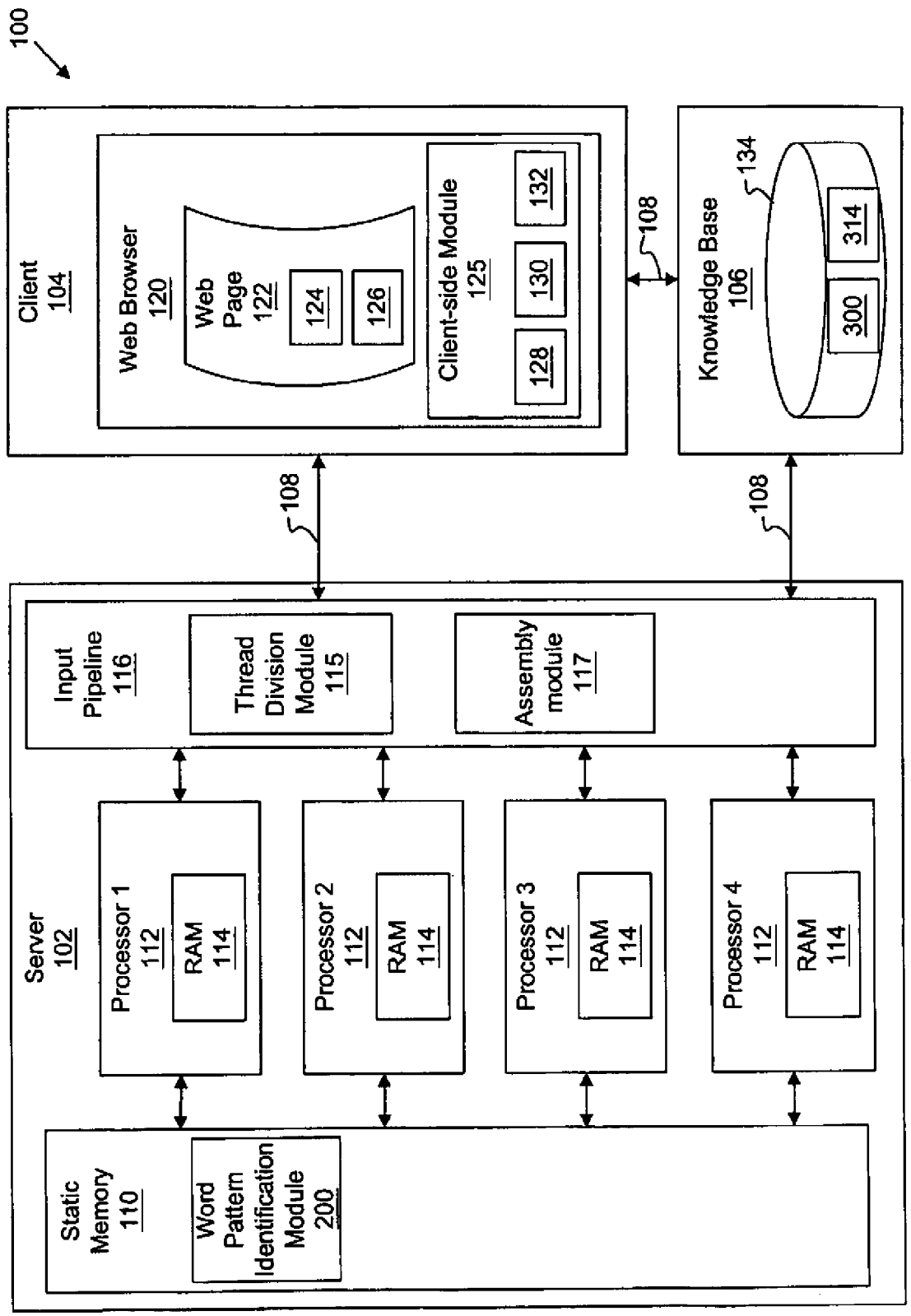
FIG. 1 is a schematic block diagram illustrating one embodiment of a system for identifying word patterns in text of the present invention.

Shown in FIG. 1 is a word pattern identification system 100 of the present invention. Within the system 100 are shown system components including a server 102, a client 104, and a knowledge base 106. Each of these components 102, 104, 106 preferably operates as or on a digital computer. The system components 102, 104, 106 may operate within a common computer, but in the preferred invention, operate as separate computers and are in communication with each other over one or more digital communication mediums such as a computer network 108. The computer network 108 may comprise any form of digital communication, including a local area network, a wide area network, or the Internet.

Within the server 102 is depicted a static memory 110, such as a hard disk drive. Also shown are a bank of parallel processors 112, and an input pipeline 116. Within the static memory 110 is disposed a word pattern identification module 200, which will be explained in greater detail below with reference to FIG. 2. The word pattern identification module 200 operates on one or more of the processors 112, typically within RAM memory 114. While four processors 112 have been shown, a single processor 112 may be used in one embodiment, while any number of multiple processors 112 may be employed in other embodiments.

The input pipeline 116 is a mechanism for providing data to the processors 112 and for returning results from the processors 112. In one embodiment, the input pipeline 116 may merely comprise a bus which is multiplexed between the processors 112. In alternate embodiments, the input pipeline comprises a separate processor 112 or other digital logic device for dividing tasks between the processors 112. Within the input pipeline 116, or otherwise communicating therewith, are a thread division module 115 and an assembly module 117. The thread division module 115 in one embodiment is used to divide tasks, such as text documents to be processed, into multiple threads for submission to the individual processors 112. The assembly module 117 in one embodiment is used for assembling the results generated by the processors 112 and submitting the results back the client 104.

The client 104 in one embodiment comprises a computer station from which a user may gain access to the Internet. Examples include a personal computer (PC), a web terminal, a palm computing device, and the like. Within the client 104 is located some form of interface with the Internet, such as a web browser. Also provided is a client-side module 125, which allows the client 104 to receive services from the server 102. Within the web browser 120 is shown a web page 122 which has been downloaded from the Internet, or which the user desires to download from the Internet. Within the web page 122 are shown one or more text documents 124 and one or more uniform resource locators (URLs) 126.

Within the client-side module 125 is shown an interface module 128 for interfacing with the server 102 and specifically with the word pattern identification module 200. Also shown are XML receipt module 130 for receiving and processing the results of a text analysis conducted by the word pattern identification module 200 and a knowledge base linking module 132 for linking results of the text analysis with the knowledge base 106.

Shown within the knowledge base 106 is a database 134 containing objects 300 and tags 314 labeling those objects. The objects 300 may comprise persons, places, things, ideas, and the like. The tags 314 are various labels by which those objects may be known. Thus, the knowledge base 106 is much like an on-line encyclopedia, and indeed, in certain embodiments, may comprise an on-line encyclopedia.

Figure 2:
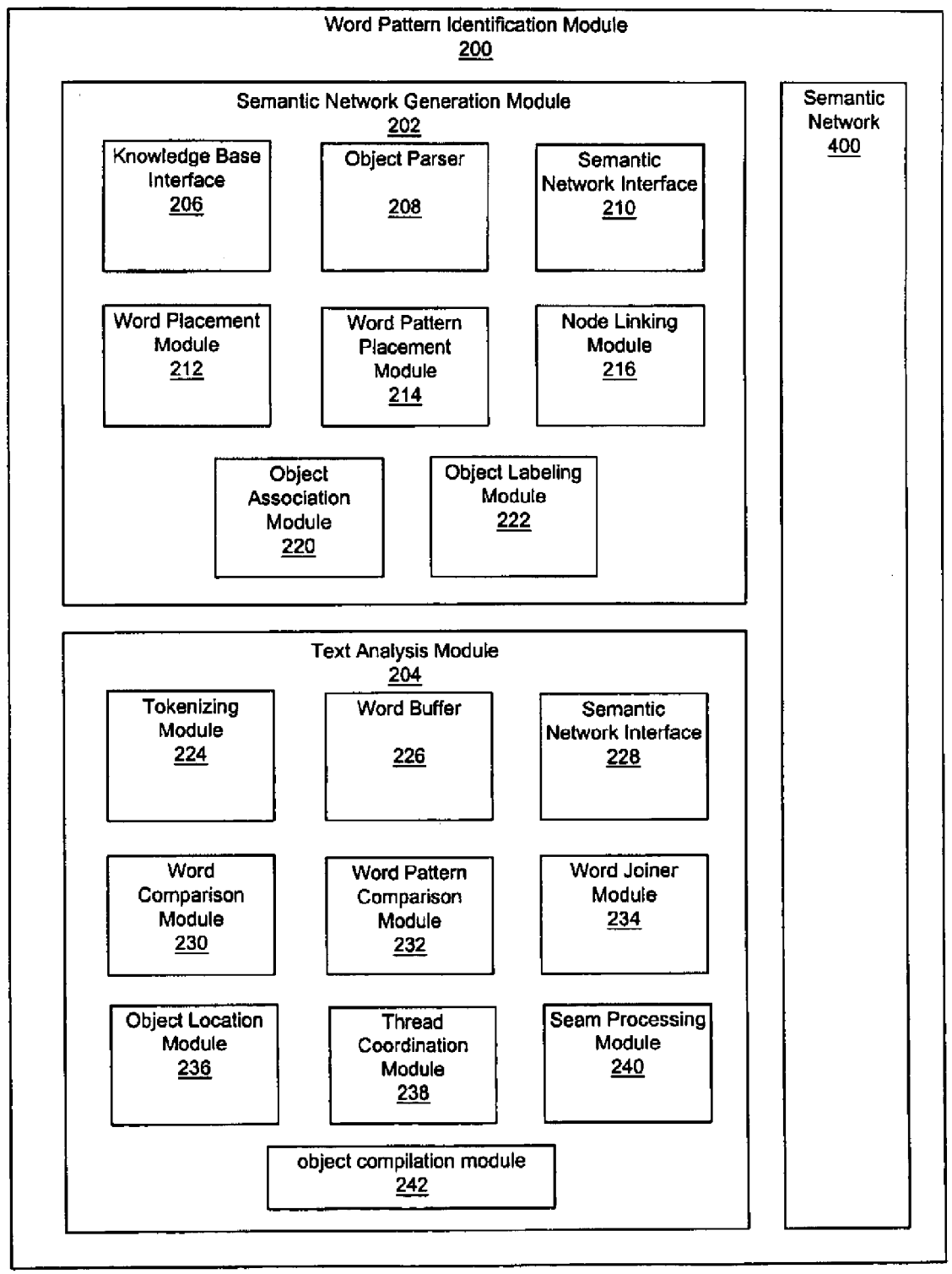
FIG. 2 is a schematic block diagram illustrating one embodiment of an word pattern identification module of the present invention.

Referring now to FIG. 2, shown therein is one embodiment of an word pattern identification module 200 of the present invention. Within the word pattern identification module 200 are shown a semantic network generation module 202, a text analysis module 204, and a semantic network 400. One example of a semantic network 400 will be explained in greater detail below with respect to FIG. 4.

Within the semantic network generation module 202 are shown a knowledge base interface 206, an object parser 208, a semantic network interface 210, a word placement module 212, a word pattern placement module 214, a node linking module 216, a hierarchical level assignment module 218, an object association module 220, and an object labeling module 222. In the depicted embodiment, the knowledge base interface 206 is configured to communicate with the knowledge base 106 of FIG. 1 in order to receive identified objects 300 from the knowledge base 106. The objects 300 and tags 314 for these objects 300 are then used to generate (or populate) the semantic network 400.

The object parser 208 receives the objects 300 and tags 314, together with other associated information, such as object type 424, and parses that information. For instance, the tags 314 are broken down into individual words and word patterns 412 comprising combinations of words 410 (of FIG. 4) that make up the tags 314 that identify an object 300. The semantic network interface 210 then generates the semantic network 400, or if it is already in existence, populates it with words 410, word patterns 412, and objects 300 transmitted from the knowledge base 106 and parsed by the object parser 208. In one embodiment, the words 410 are located at an extreme hierarchical level as word nodes 411 of the semantic network 400.

The word placement module 212 locates words 410 within the tags 314 and passes the located words 410 to the semantic network interface 210 for placement in the semantic network. The word pattern placement module 214 takes the words 410 and builds those words 410 into word patterns 412. For instance, the object International Business Machines may be transmitted from the knowledge base 106. The words "International Business Machines" form the tag 314 of the object, which is preferably also transmitted. The tag 314 is also a word pattern which can be broken down into the words international, business, and machines. These words 410 are then, in turn, recombined by the word pattern placement module 214 into word patterns 412 including, in this example, International Business, and International Business Machines. The abbreviation IBM may be an alternate tag 314 that is also placed as a word and/or word pattern into the semantic network to identify the object International Business Machines. Each of the word patterns that can be formed from the various tags 314 of an object 300 are placed at nodes 413 within the semantic network 400.

A node linking module 216 is preferably configured to interconnect the various nodes 411, 413, 421, 424, of the semantic network 400. For example, In the semantic network 400 of FIG. 4, the object Mr. Don M. Simpson is shown. The object 300 with its tags 314, 315 in one embodiment is received from the knowledge base 106 and parsed by the object parser 208. The resultant words mr, don, m, and simpson 410, are placed into word nodes 411 by the word placement module 212. These words 410 are then combined into word patterns 412 by the word pattern placement module 214 and placed at word pattern nodes 413. The word patterns 412 are linked together by the node linking module 216. Also during this process, the hierarchical level assignment module 218 preferably assigns a hierarchical level to each of the nodes 410, 412, 300, 416. In one embodiment, the less words in the word or word pattern that inhabits the node, the lower the hierarchical level of the node.

Figure 4:
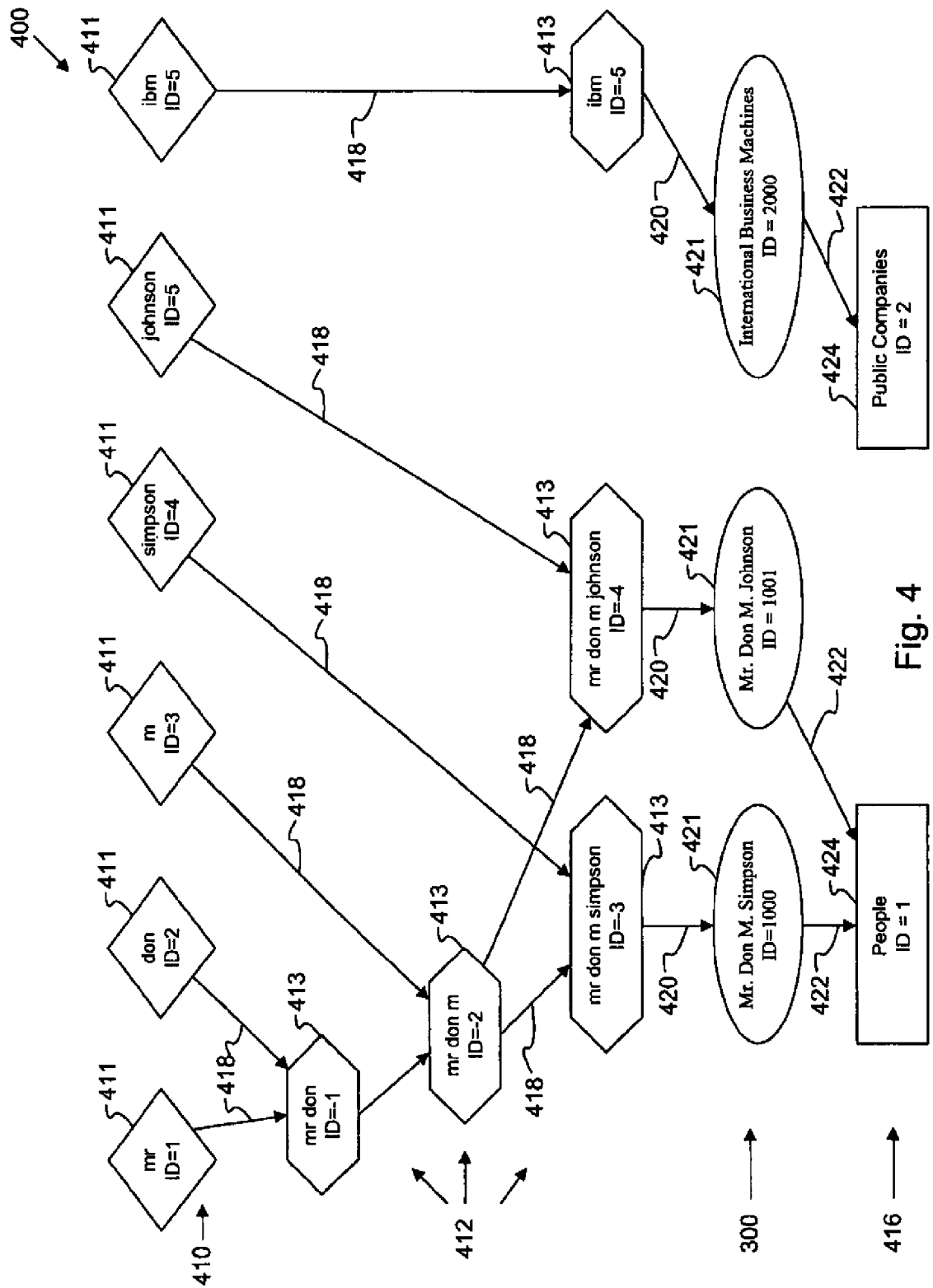
FIG. 4 is schematic block diagram illustrating one example of a semantic network of the present invention.

Returning to the example of FIG. 4, the words 411 with mr, don, m, and simpson are assigned word identification numbers. The word patterns 413 are assigned word pattern identification numbers, which in the depicted embodiment comprise negative numbers. Objects 300 are similarly assigned object identification numbers. Object types 416 also have corresponding identification numbers.

An object association module 220 is preferably configured to link 420 or otherwise associate an object 300 with the word patterns 412 devised from the tag 314 of that object 300. For example, as depicted in FIG. 4, the word pattern mr don m simpson 412 is linked 420 with the object Mr. Don M. Simpson 300. The word pattern International Business Machines which is referenced in this example from the word pattern ibm 412 is linked 420 with the object International Business Machines 300.

Figure 3:
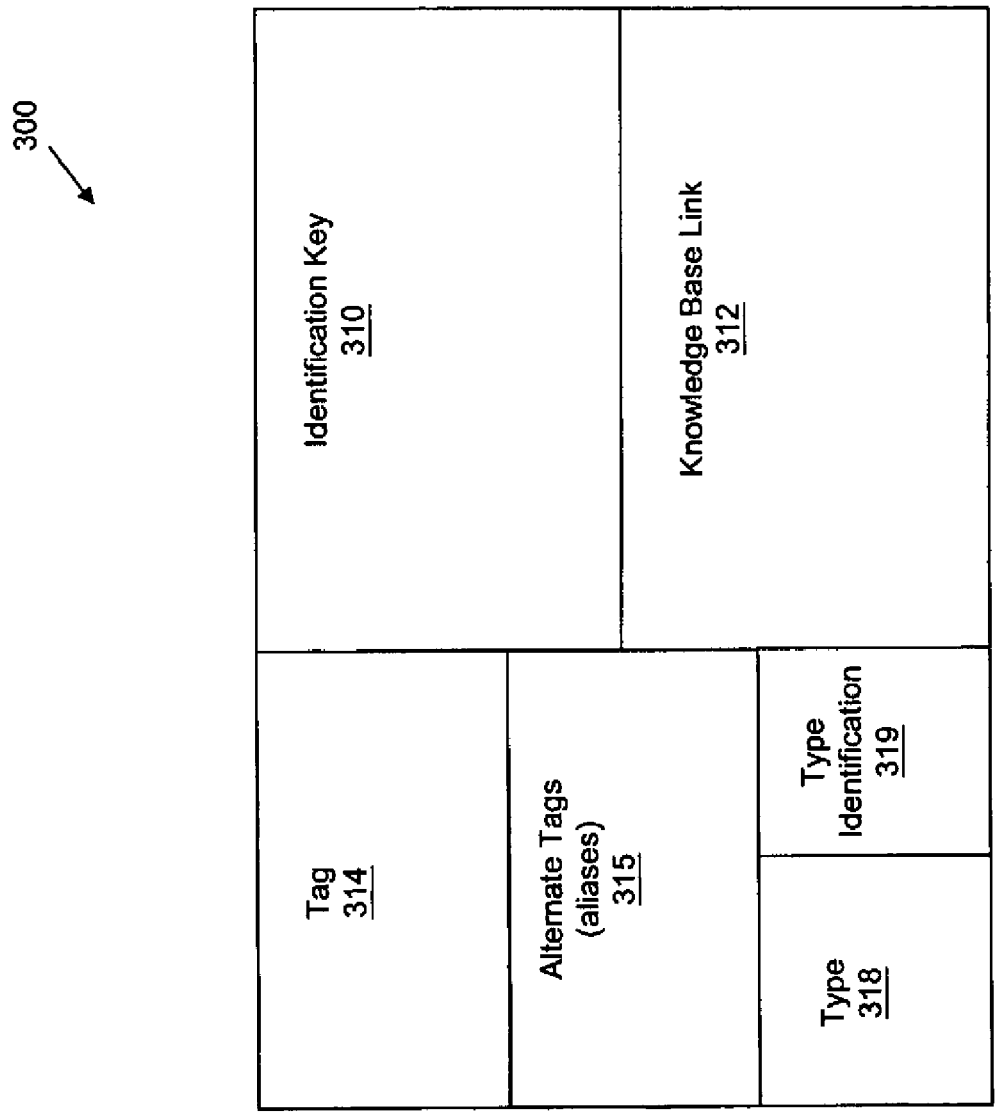
FIG. 3 is a schematic block diagram illustrating one embodiment of an object residing within a semantic network of the present invention.

One example of an object 300 as stored in the semantic network 400 is shown in FIG. 3. The object 300 of FIG. 3 is depicted as having components associated together with the object 300, including an identification key 310, a knowledge base link 312, a tag 314, alternate tags or aliases 315, a type 318, and a type identification number 319. Of course, much more information about the object may be stored within the semantic network 400, but need not be, as the knowledge base link 312 allows for a connection to be made to the typically more complete data about an object within the knowledge base.

The identification key 310 is preferably a code that is globally unique for each object 400 within the semantic network 400, in order to uniquely identify each object 400. In some embodiments, the knowledge base link 312 may comprise a unique code from the knowledge base, and obviate the need for a separate identification key 310. The object type 318 is the type of the object, such as person, place, company, idea, and the like. The object type 318 may be accompanied by or substituted for by an object type identification number 319 that is unique for each object type. Preferably, each object 300 is represented only once in the semantic network 400, though more than one word pattern 412 may point to an object 300.

Returning to FIG. 2, an object labeling module 222 is used to link 422 the object 300 with its object type 416, of which a selected finite set are preferably listed within the semantic network 400. For instance, in the semantic network 400 of FIG. 4, two different object types 416 are listed, people and public companies. Each object type 416 is preferably provided with its own unique type identification number, as depicted. Of course, while only two object types are depicted, it should be readily apparent that an infinite number of possibilities for object types exist, and a typical semantic network may have numerous object types 416 within it.

The text analysis module 204 is in one embodiment used during operation of the word pattern identification module 200 to service requests from the client 104 of FIG. 1 to process a text document 124 and identify word patterns 412 and/or objects 300 within the text document 124. While the semantic network generation module 202 and the text analysis module 204 are shown within a common module 200, the two could comprise separate software programs. In the depicted embodiment, however, the word pattern identification module 200 is a single software program configured to operate within the server 102, and to coordinate with a client module 125 which is preferably a separate software program.

Shown within the text analysis module 204 of the depicted embodiment are a tokenizing module 224, a word buffer 226, a semantic network interface module 228, a word comparison module 230, a node comparison module 232, a word joiner module 234, an object location module 236, a thread coordination module 238, and a seam processing module 240. The text analysis module 204 preferably operates within one or more processors 112 of FIG. 1, in conjunction with the semantic network 400, which is also preferably loaded into RAM 114 of each processor 112. The two communicate through a semantic network interface module 228. The text analysis module 204 and the semantic network 400 may be located within separate software programs, and indeed, the semantic network may be remote to the text analysis module, communicating over a network, modem, or the like. Nevertheless, in the depicted embodiment, the text analysis module 204 and the semantic network 400 operate within the same software program 200 on the server 102, and a version is loaded into RAM 114 of each parallel processor 112.

Text documents 124 or threads of text documents 124 may be received by the tokenizing module 224 and broken or "tokenized" into separate words. Each tokenized word (and more preferably, a group of adjacent words) is received into the word buffer 226 as the words stream into the text analysis module 204. While the tokenized word is within the word buffer 226, it is examined by the word comparison module 230 to determine if the word can be found within the lexical database. In one embodiment, this comprises comparing the word, using the semantic network interface module 228, to words 410 within the semantic network 400. The word nodes 411 may be arranged within the semantic network 400 using a beneficial data structure. In one embodiment, for example, the words are listed alphabetically within a binary tree. In another embodiment, sorting methods such as a bubble sort are used to find matching words 410. In a further example, a hashing algorithm is used.

Preferably, the text document 124 is loaded entirely into the buffer 226. Nevertheless, other embodiments may be employed where only a portion of the text document is loaded into the buffer 226. Additionally, it is preferred that the buffer 226 is located in RAM memory 114. Thus, the text document is preferably never persistently stored. That is, it is never stored in static memory 110. This allows the word pattern and object identification to be conducted and results returned in real time or near real time.

When a word is found to be within the semantic network, the word pattern comparison module 232 compares the word for word patterns 412 of the semantic network 400. In so doing, an adjacent word and preferably the next successive word in the text document 124 is added to the word by the word joiner module 234. The string of words is then compared to word patterns 412 of the semantic network 400. In one embodiment, this comprises following links 418 within the semantic network 400 to associated word patterns 412 within word pattern nodes 413. So doing eliminates the need for examining every word pattern 412 in finding matches. This process is continued, following the links until no more word pattern matches are found. At this point, the object location module 236 is used to determine whether the located matching word patterns 412 correspond to objects 300 within the semantic network 400.

In one embodiment, only the lowest level word pattern that corresponds to a tag of an object is used, and that object is returned as the result. For instance, if the words international, business, and machines pass through the text analysis module 204, several of the corresponding word patterns may be linked to objects 300. For instance, international business may be an object with a type corresponding to a course of study, a discipline, and the like. The word pattern international, business, and machines may correspond to the object International Business Machines, which is a public company. Both of these results may be returned in certain embodiments, but in one embodiment, only the object for the lowest level word pattern, in this example, International Business Machines, is returned.

The objects 300 that are located from the stream of text 124 are compiled with an object compilation module 242. The objects are assembled in order and may be placed in a text document, such as an XML document and then transmitted back to the client 104. The object compilation module may be periodically streamed back to the client 104, but in one embodiment is returned to the assembly module 117 of FIG. 1. When parallel processing is used, the thread coordination module 238 is used to break the incoming stream of words from the text document 124 into multiple threads, and may perform the function recited for the thread division module 115, or may coordinate with the thread division module 115.

In one embodiment, the thread coordination module keeps track of where seams in the threads occur. The seam processing module 240 then assembles the words from adjacent threads at the seams of the thread and examines a selected number of words on both sides of the threads for words, word patterns, and objects in the manner described above. Located objects are then assembled by the assembly module 117, which may be a designated seam processing module 240 into the final XML or other type of document for submission to the client 104.

Figure 5:
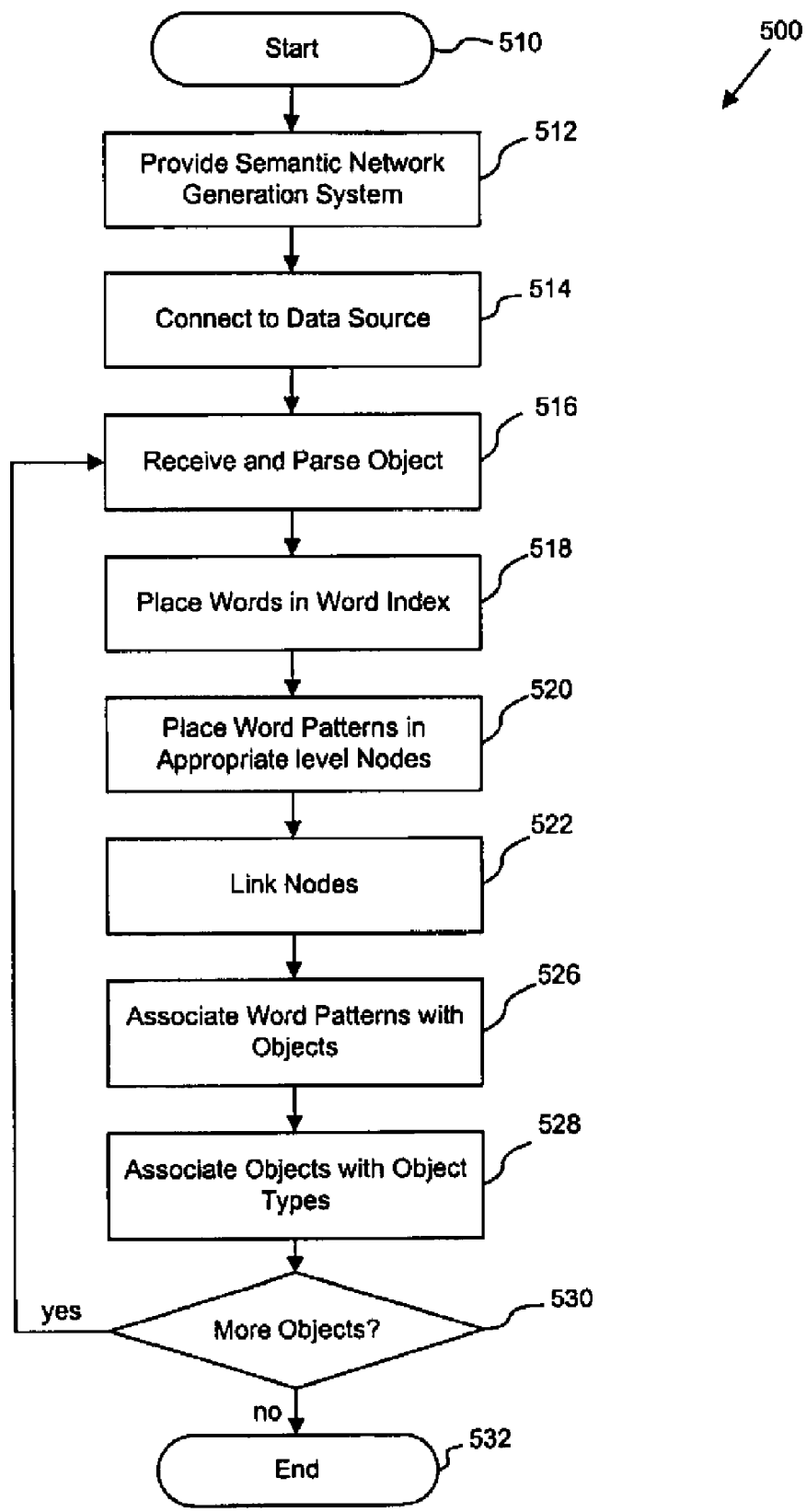
FIG. 5 is a schematic flow chart diagram invention illustrating one embodiment of a method for generating a semantic network of the present invention of the present invention.

FIG. 5 illustrates one embodiment of a method 500 for generating a semantic network of the present invention. The method 500 is also one embodiment of a manner of use of the semantic network construction module 202 of FIG. 2. The method of FIG. 5 starts 510, after which a semantic network generation system is provided 512. In one embodiment, the semantic network generation system comprises the semantic network generation module 202 of FIG. 2, and may be provided together with the other components of the system 200 or independently.

The method 500 also preferably comprises connecting 514 to a data source. In one embodiment, this comprises connecting the server 102 of FIG. 1 to the knowledge base 106 in order to download objects 300 for submission into the semantic network 400. This may be conducted, as discussed, by the knowledge base interface 206 of FIG. 1.

Once connected to the data source, objects 300 are preferably received from the data source and parsed 516. This may be conducted, as discussed above, by the object parser 208. In one embodiment, the tag 314 of the object 300 is parsed into words 410. The parsed words are placed 518 into a word index, which in the depiction of FIG. 4, corresponds to nodes 410 at an extreme (e.g., top) level of the semantic network. Of course, no action need be taken on words that are already in the word index when encountered. The placement of the words into the word index may be conducted by the word placement module 212 of FIG. 2.

Word patterns 412 are then generated from the words 410 that make up the tag 314 and are placed 520 in nodes 413 within the semantic network 400. Thus, for every object 300 and corresponding tag, 314, a word node 411 is formed for every word in the tag 314, and word patterns 412 are formed for every successive combination of those words 410. This may be conducted by the word pattern placement module 214. The generated nodes are then linked together 522. The nodes may be linked 522 by the node linking module 216. In one embodiment, each combination of words 410 is linked 522 to the word pattern 412 formed. Word patterns 412 and words 410 combined to make lower level word patterns 412 are linked 418 to the lower level word patterns 412. Additionally, word patterns 412 that comprise object tags 314 are linked 420 to the objects 300 identified. Each object 300 may also be linked 422 to an object type 416 and to any other desired identifying information.

Word patterns 412 that correspond to objects 300 are then associated 526 with the respective objects 300 identified by the word patterns 412. This may be conducted by the object association module 220.

Objects 300 may then be associated 528 with object types 416. This may be conducted by the object labeling module 222. The method 500 continues this process as objects are being downloaded from the data source, testing 530 to see if more objects are available. If so, the method 500 loops back and receives and parses the received objects 300 and continues on through the successive operations. If more objects 300 are not available, the method 500 ends 532.

Figure 6:
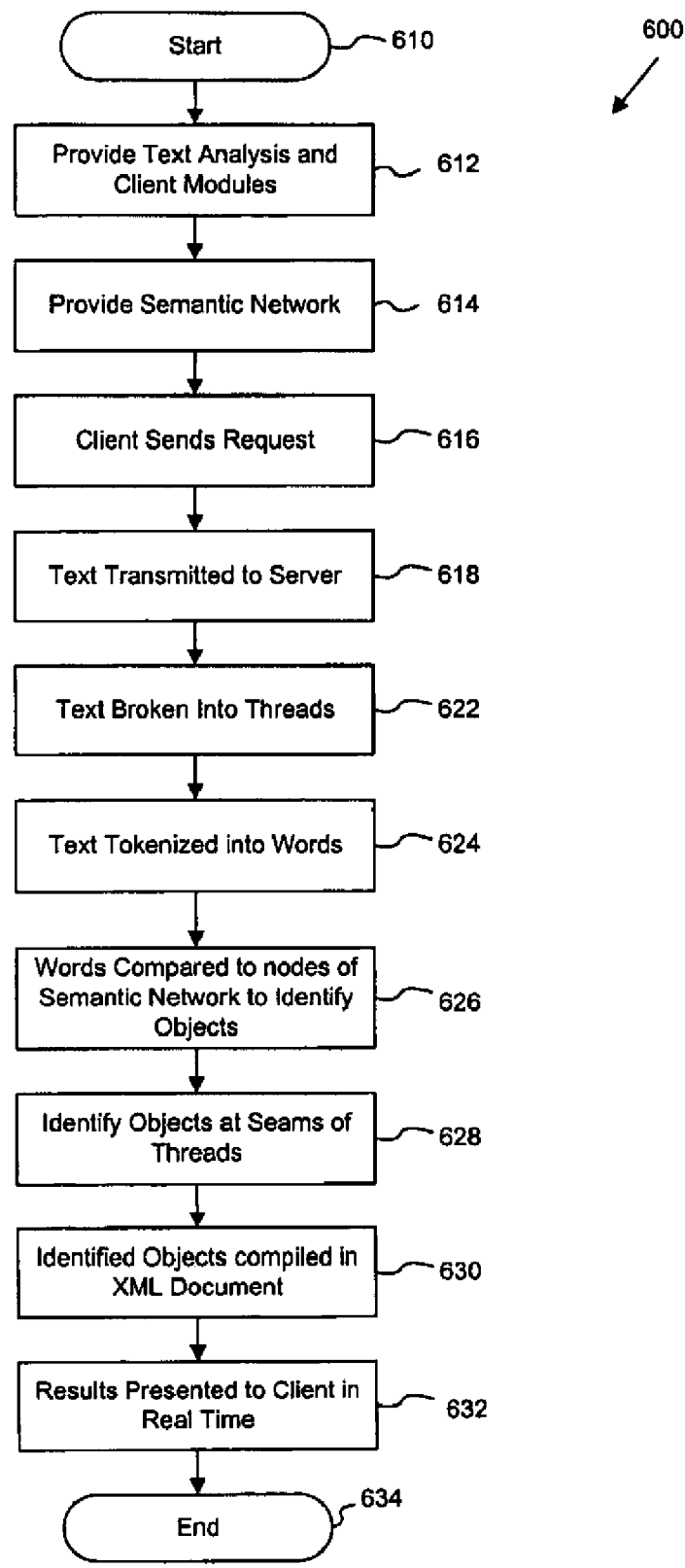
FIG. 6 is a schematic flow chart diagram illustrating one embodiment of a method of the present invention for identifying word patterns in text.

FIG. 6 is a flow chart diagram illustrating one embodiment of a method 600 for locating word patterns and objects in a stream of text. The method 600 starts 610 and provides 612 a text analysis module and client software. In one embodiment, these comprise the text analysis module 204 of FIG. 2 and the client side module 125 of FIG. 1. A semantic network is also preferably provided 614. In one embodiment, a semantic network is provided in the manner described above with reference to FIG. 5.

Under the method 600, a client requests 616 a text analysis service in which word patterns and/or objects are to be located in a body of text. The body of text preferably comprises a text document 124, and is preferably received by the method 600 as a stream of text. In one embodiment, a user of the client 104 utilizes a web browser 120 and requests a web page 122. The user also requests that the text 124 of the web page 122 be analyzed for identified objects 300. The request may be conducted in any manner, including toggling a the service off and on in a preference file of the web browser 120. The client may then make the request merely by clicking on a URL identifying the web page 122.

The web browser 120 then initiates a request over the Internet for the web page 122. The request is intercepted by the client side module 125, which specifies in the request that the web page 124 is to first be sent to the server 102. The server 102 then receives the text document 124 and processes the text document, locating identified objects 300 referenced in the text 124 of the web page 122. Of course, other suitable manners of submitting a request 616 from a client 104 to a text processing program to locate objects in a block of text may also be employed.

Under the method 600, the requested text 124 is transmitted 618 to the text processing program. In one embodiment, this comprises streaming the text documents 124 of a web page 122 or other designated text to the server 102. The text may be received into the input pipeline 116.

The text may then be broken 622 into a plurality of threads, if the server 102 has multiprocessing capabilities. The threads are submitted to the individual processors, and the word pattern identification software on the processors receives the threads, which are processed simultaneously. Preferably, a copy of the semantic network is loaded into RAM 114 of each participating processor 112. The method 600 is thus scalable, as more processors can be provided for larger text documents 124.

Within each processor 112, the text is tokenized 624 into words as it streams into the processor 112. This may be conducted by a tokenizing module 224. The tokenized words are then compared to the contents of the semantic network to see whether the words are present therein. In one embodiment, this comprises placing the words in the word buffer 226 and using the word comparison module 230 to determine if a match for the word is found among the word nodes 411. If so, the word pattern comparison module 232 and word joiner module 234 are used to find word patterns 412. One manner of doing this is illustrated in FIG. 7.

Figure 7:
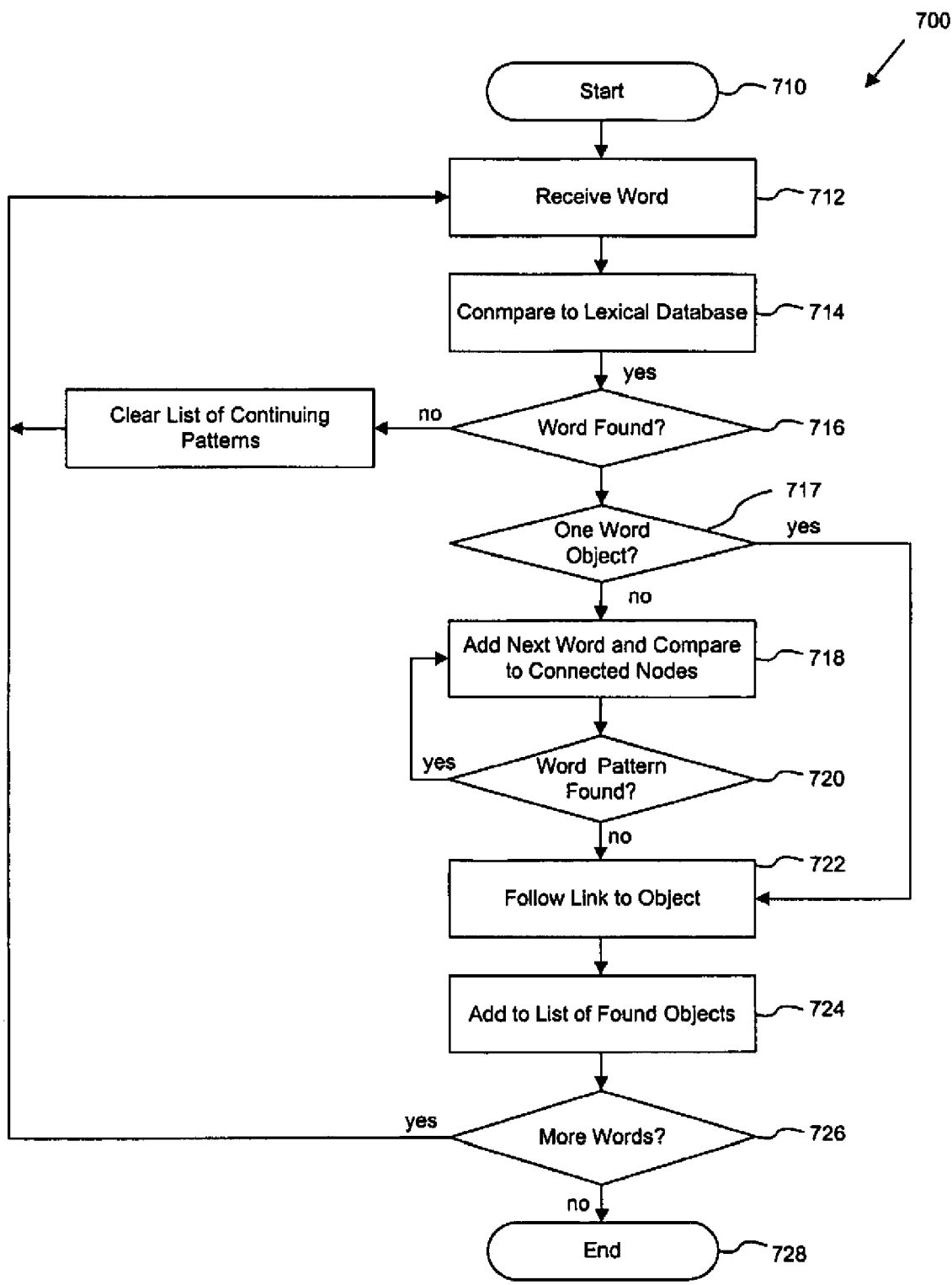
FIG. 7 is a schematic flow chart diagram illustrating one embodiment of a method of the present invention for consulting a semantic network to identify words, word patterns, and objects in text.

Referring to FIG. 7, a method 700 is shown therein that starts 710 and then receives 712 a word to be analyzed. The word is preferably received into the word buffer 226. The word is then compared 714 to the lexical database. In one embodiment, this comprises the word comparison module 230 comparing the word against the word nodes 411 of the semantic network 400. This is preferably conducted quickly, and allows the text 124 to stream in with results being transmitted in response in real time due to the fact that the semantic network is preferably stored in its entirety within a common RAM memory. The semantic network may also utilize other data structures, as discussed, for quick searching of the words 410 for matches.

The method 700 thus checks 716 for a match to each word streamed in. If a match is not found, the method 700 loops back and receives the next inputted word. If a match is found, the next successive word is added to the original word and the resulting string is compared to word pattern nodes 413 connected 418 to the node 411 at which the match was found.

If a matching word pattern is found 720, the method 700 loops back and adds 718 the next successive word and checks 720 for a matching word pattern. This process continues until no match is found. The links 420 are then followed 722 to located objects 300. As discussed, this may be conducted for all located word patterns 412 leading to an object, or only for the most qualified word patterns 412. The located objects 300 are then provided as output. This may comprise listing the objects 300 on an output document or data file, as indicated at a step 724.

The method 700 is continued while a test 726 for more submitted words is positive. When no more words are submitted, the method 700 ends 728.

Returning to FIG. 6, once all objects 300 in each thread are located, the objects at the seams of the threads are identified 628. This may be conducted by the seam processing module 240 of FIG. 2, in the manner discussed above. Of course, if only a single thread is used, this step may be omitted.

Identified objects 300 are preferably compiled 630 into a file for transmission back to the client. In one embodiment, this comprises compiling the text 124 together with notations of the located objects 300 where they occur in the text into a document such as an XML document. This document is then transmitted back to the client and presented 632 to a user. In one embodiment, due to the efficiency of the system and method of the present invention, the results are presented in real time or in near real time.

In one embodiment, the results are presented 632 by turning the identified word patterns 412 that comprise the tag 314 of an object 300 into a URL in the results document, that as discussed, may comprise an XML document. These links may be followed to more information about the objects 300. For instance, the links 126 may lead to listings of the object or directions to the listings of the object 300 in the knowledge base 106 or other database. By clicking on the link, a user can bring up a file on the object 300. For instance, a window may pop up with a file from the knowledge base regarding the object 300. The file may be a dictionary definition, further links, or other information regarding the object that may be useful to the user.

In a further embodiment, rather than provide the text document 124 from the Internet, the text document 124 may be provided from a voice recognition program. In such an embodiment, the identified objects could, for instance, comprise commands to the voice recognition program.

The present invention is claimed and described herein in terms of "modules." As used herein, modules may refer to various subsystems of the invention. For example, where the invention is implemented in software form, a module refers to lines of software code instructions. Modules also refer to electronic hardware configured to achieve the given purpose of the module. As such, a module is a structural element.

As will be readily understood to one skilled in the art of software development, more than one instruction may exist within a module. The instructions may not necessarily be located contiguously, and could be spread out among various different portions of one or more software programs, including within different objects, routines, functions, and the like. Similarly, the hardware components of a subsystem or module, such as integrated circuits, logic gates, discrete devices, and the like, need not be organized into a single circuit, but could be distributed among one or more circuits. Unless stated otherwise, hardware or software implementations may be used interchangeably to achieve the structure and function of the disclosed modules.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system for identifying objects referenced in a stream of text, the system comprising:

an input pipeline configured to receive an incoming stream of text comprised of words;

a text analysis module configured to consult a semantic network to automatically identify one or more word patterns in the incoming stream of text, such that each word in the incoming stream is searched once in the semantic network, to break the stream of text into individual words, to analyze each word in an order of occurrence of the word in the stream of text by comparing the individual words to identified words in the semantic network, and to, upon finding a match between an individual word in the stream of text and an identified word in the semantic network, compare the individual word and an adjacent word of the stream of text to a word pattern in the semantic network; and an object association module configured to reference a known object within the semantic network, the known object identified by a word pattern of the semantic network.

2. The system of claim 1, wherein the semantic network is configured to be loaded substantially entirely into a common RAM memory space of a processor, and wherein the text analysis module is configured to consult the semantic network within the RAM memory.

3. The system of claim 1, wherein the input pipeline is further configured to divide the stream of text into a plurality of threads such that the semantic network may be consulted concurrently for words in each of the plurality of threads.

4. The system of claim 1, further comprising a word pattern comparison module configured to consult the semantic network in a hierarchical order moving from identified nodes to related nodes linked with the identified nodes.

5. The system of claim 1, wherein the text analysis module is further configured to examine words in the stream of text in a sequential order as the words are received and format the stream of text to represent identified objects without persistently storing the stream of text.

6. The system of claim 1, wherein the text analysis module is configured to continually add words of the stream of text to recognized word patterns and compare the result to other word patterns in the semantic network until no more word patterns are located.

7. The system of claim 1, further comprising a compilation module configured to present the identified known objects to a user.

8. The system of claim 7, wherein the compilation module is configured to present the identified known objects to a user by providing links between identified word patterns in the stream of text and objects in a knowledge base to which the word patterns identify.

* * * * *